(12) United States Patent
Cui et al.

(10) Patent No.: US 10,979,972 B2
(45) Date of Patent: Apr. 13, 2021

(54) INTEGRATED ACCESS AND BACKHAUL LINK SELECTION

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/509,809

(22) Filed: Jul. 12, 2019

(65) Prior Publication Data

US 2021/0014782 A1 Jan. 14, 2021

(51) Int. Cl.
*H04W 84/04* (2009.01)
*H04W 48/20* (2009.01)
*H04W 76/11* (2018.01)
*H04W 48/16* (2009.01)

(52) U.S. Cl.
CPC ........... *H04W 48/20* (2013.01); *H04W 48/16* (2013.01); *H04W 76/11* (2018.02); *H04W 84/042* (2013.01)

(58) Field of Classification Search
CPC ...... H04W 48/20; H04W 76/11; H04W 48/16
See application file for complete search history.

(56) References Cited

U.S. PATENT DOCUMENTS 10,511,990 B1 * 12/2019 Reeves ............. H04W 28/0231
2011/0194535 A1 * 8/2011 Johansson ............. H04W 28/24
370/331
2014/0321282 A1 * 10/2014 Pragada ............ H04W 36/0072
370/235
2015/0304018 A1 * 10/2015 Pitakdumrongkija ......................
H04B 7/15592
370/315
2017/0079053 A1 * 3/2017 Zhang .................... H04W 48/16
2017/0196015 A1 * 7/2017 Lu ........................ H04W 72/12
2019/0021084 A1 * 1/2019 Stirling-Gallacher ......................
H04W 72/048
2019/0068205 A1 * 2/2019 Tamura ................... H03L 7/081
2019/0254037 A1 * 8/2019 Gupta ................. H04W 72/042
2019/0378140 A1 * 12/2019 Sarkissian ............ G06Q 20/065
(Continued)

OTHER PUBLICATIONS

3GPP, "5G; NR; Radio Resource Control (RRC); Protocol specification (3GPP TS 38.331 version 15.5.1 Release 15)," © ETSI 2019, 283 pages.

*Primary Examiner* — Chi Ho A Lee
*Assistant Examiner* — Andrew Lee
(74) *Attorney, Agent, or Firm* — Amin, Turocy & Watson, LLP

(57) ABSTRACT

The disclosed technology is generally directed towards communicating whether a small deployed (e.g., millimeter wave 5G) cell is capable of operating as a self-backhaul device and can thereby operate as a relay node for another network device's backhaul (e.g., integrated access and backhaul) traffic. Data communicated between network devices, such as an attribute in in the CellAccessRelatedInfo information element of the system information block (e.g., a SIB type 1) message, can be used to convey the self-backhaul capability information. The network device that is searching for a self-backhaul cell evaluates the self-backhaul data of another cell, along with other selection criteria, to determine if the other cell can serve as a backhaul link; if the criteria is met, that other cell is selected, otherwise another cell is searched for such a capability.

20 Claims, 11 Drawing Sheets

(56) References Cited

U.S. PATENT DOCUMENTS

2020/0045610 A1* 2/2020 Shih .................... H04W 40/248
2020/0053735 A1* 2/2020 Gupta ................... H04W 88/14
2020/0145177 A1* 5/2020 Jung .................... H04L 5/1469

* cited by examiner

```
-- ASN1START
-- TAG-SIB1-START

SIB1 ::=          SEQUENCE {
    cellSelectionInfo               SEQUENCE {
        q-RxLevMin                      Q-RxLevMin,
        q-RxLevMinOffset                INTEGER (1..8)
        q-RxLevMinSUL                   Q-RxLevMin
        q-QualMin                       Q-QualMin
        q-QualMinOffset                 INTEGER (1..8)
    },
    cellAccessRelatedInfo           CellAccessRelatedInfo,
    connEstFailureControl           ConnEstFailureControl
    si-SchedulingInfo               SI-SchedulingInfo
    servingCellConfigCommon         ServingCellConfigCommonSIB
    ims-EmergencySupport            ENUMERATED {true}
    eCallOverIMS-Support            ENUMERATED {true}
    ue-TimersAndConstants           UE-TimersAndConstants uac-BarringInfo                 SEQUENCE {
        uac-BarringForCommon            UAC-BarringPerCatList
        uac-BarringPerPLMN-List         UAC-BarringPerPLMN-List
        uac-BarringInfoSetList,
```

FIG. 3

```
-- ASN1START
-- TAG-CELL-ACCESS-RELATED-INFO-START

CellAccessRelatedInfo    ::=    SEQUENCE {
    plmn-IdentityList           PLMN-IdentityInfoList,
    cellReservedForOtherUse     ENUMERATED {true} OPTIONAL,
    IAB-capable                 ENUMERATED {true} OPTIONAL,     -- Need R
    ...
}

-- TAG- CELL-ACCESS-RELATED-INFO-STOP
-- ASN1STOP
```

INTEGRATED ACCESS AND BACKHAUL LINK SELECTION

TECHNICAL FIELD

The present application relates generally to the field of mobile communications and, for example, to Integrated Access and Backhaul (IAB) cell selection in New Radio (NR, sometimes referred to as 5G) Radio Access Networks (RAN) and beyond.

BACKGROUND

To meet the huge demand for data centric applications, Third Generation Partnership Project (3GPP) systems and systems that employ one or more aspects of the specifications of the Fourth Generation (4G) standard for wireless communications are being extended to a Fifth Generation (5G) standard for wireless communications. 5G needs to support various applications including Enhanced Mobile Broadband (eMBB), mission critical, and Ultra-reliable low latency communication (URLLC) applications. In general, Ultra reliability and low latency is a significant feature of a 5G network, but significant bandwidth is needed.

A high level of densification of small cells with millimeter wave (mmW) Transmit and Receive Points (TRPs) and self-backhaul are among the technology advances of 5G to meet the bandwidth demand. To achieve a highly reliable 5G network, improving the transport availability of millimeter wave mmW TRPs is needed. For example, via Integrated Access and Backhaul (IAB), one mmW cell can serve as a relay node for backhaul traffic to one or more other cells. However, not every mmW cell is required to serve as such a relay node.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 illustrates part of a system information block message, in accordance with various aspects and embodiments of the subject disclosure.

FIG. 4 illustrates an information element associated with the system information block of claim 3, in which the information element indicates whether a network device is self-backhaul capable, in accordance with various aspects and embodiments of the subject disclosure, in accordance with various aspects and embodiments of the subject disclosure.

DETAILED DESCRIPTION

Figure 1:
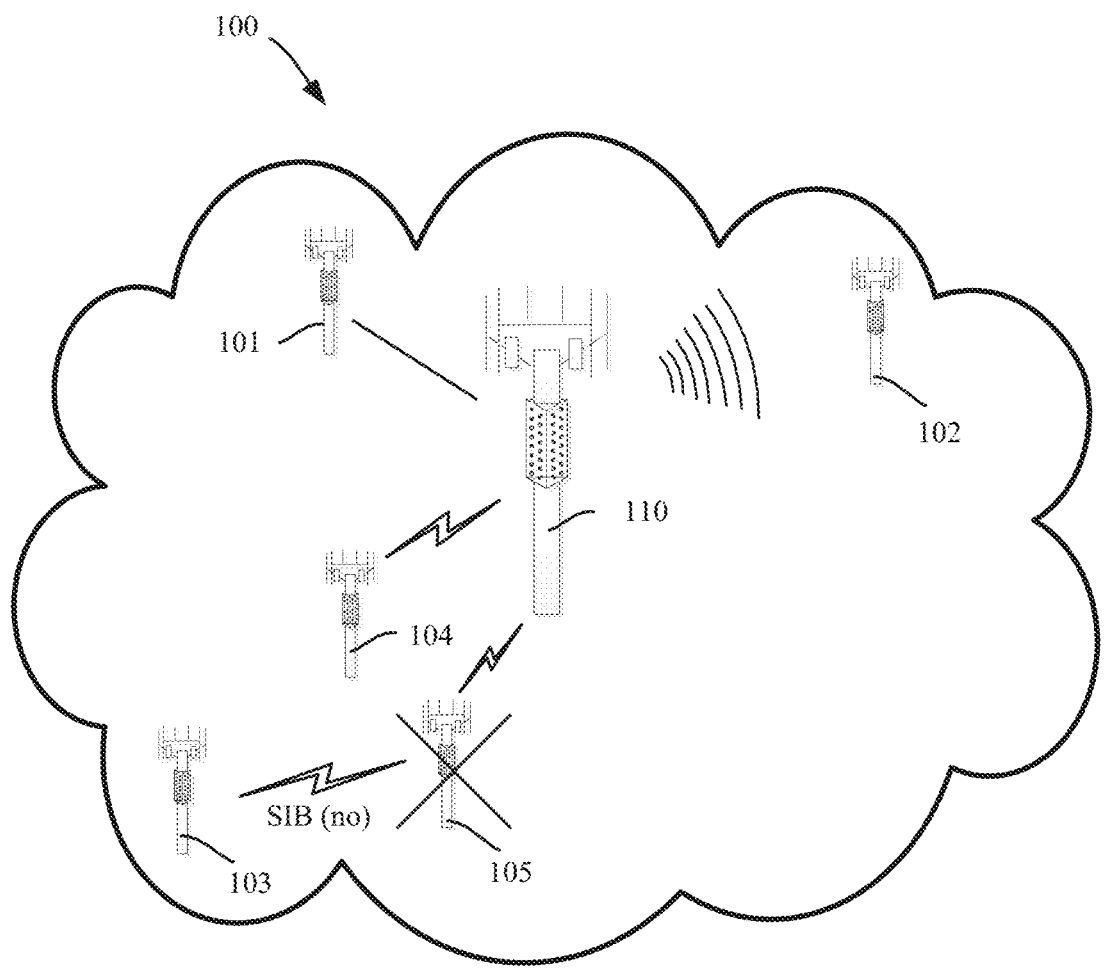
FIGS. 1 and 2 illustrate an example wireless communication system comprising network devices/cells, in accordance with various aspects and embodiments of the subject disclosure.

Various embodiments disclosed herein are directed towards improving the efficiency of self-backhaul cell selection. In one or more aspects, the New Radio (NR), system information block (SIB) message is configured to describe whether a given cell has self-backhaul (e.g., Integrated Access and Backhaul (IAB)) capability. In this way, when a millimeter wave (mmW) cell is in need of using IAB for self-backhaul, the cell in need obtains and uses the other cell's IAB capability data as one of the deciding criteria in the cell selection procedure.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some embodiments the non-limiting term radio network node or simply network node is used. It refers to any type of network node that serves UE and/or connected to other network node or network element or any radio node from where UE receives signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

The embodiments are described in particular for NR. The embodiments are however applicable to any RAT or multi-RAT system where the UE operates using multiple carriers e.g. LTE FDD/TDD, GSM/GERAN, Wi-Fi, WLAN, WiMax, CDMA2000 etc.

The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Note that the embodiments disclosed herein apply equally for Multi RAB (radio bearers) on some carriers (that is data plus speech is simultaneously scheduled).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Figure 2:
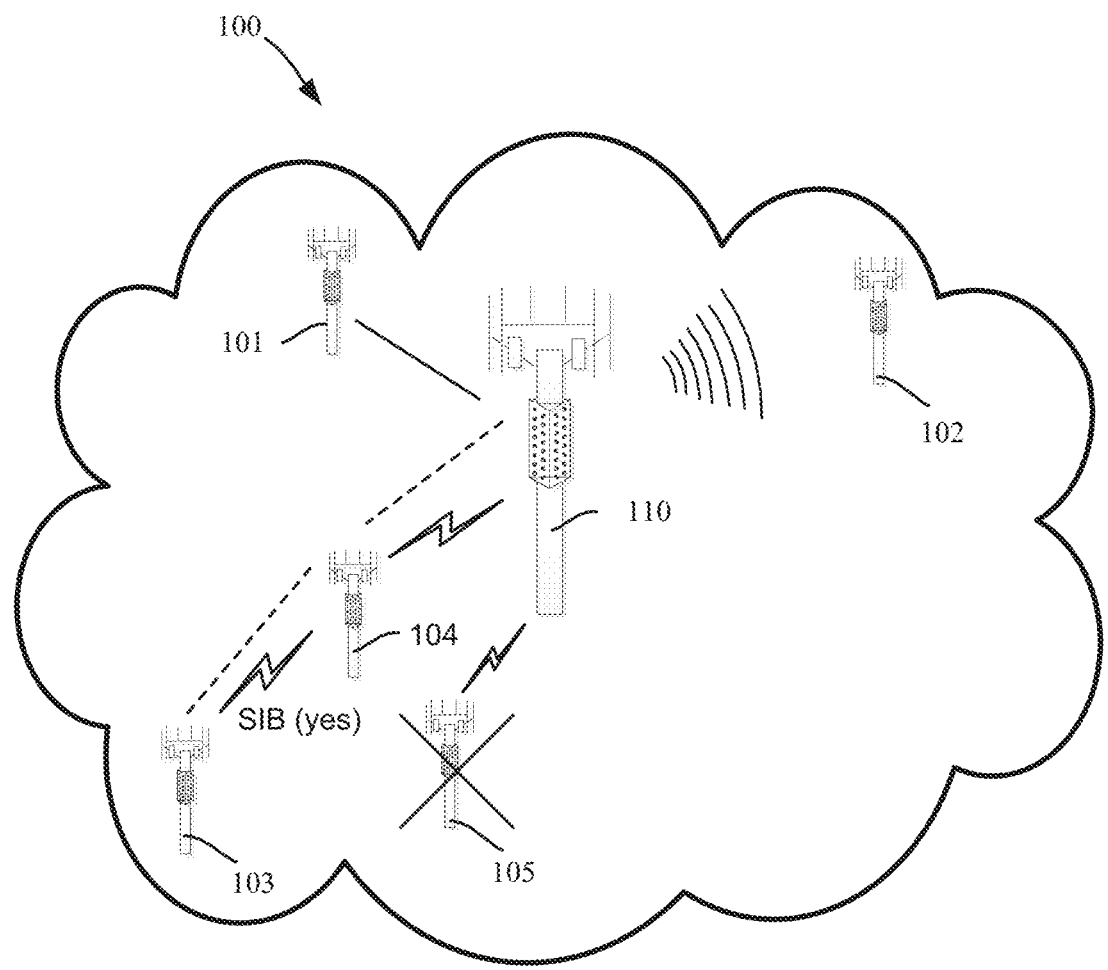

FIGS. 1 and 2 illustrate an example wireless communication system (e.g., a 5G RAN system) 100 in accordance with various aspects and embodiments of the subject disclosure. In one or more embodiments, system 100 can comprise one or more millimeter wave cells, (millimeter wave cells 101-105 are exemplified in FIGS. 1 and 2, although it is understood that any practical number may be present), each of which can have one or more antenna panels having vertical and horizontal elements, for example. A macro cell 110 such a gNodeB network device comprising a software-defined network (SDN), and which is typically linked more directly to a core network, is also illustrated.

Although not explicitly shown, a user equipment(s) (UE) are typically communicating in the 5G RAN system 100 via the millimeter wave cells 101-105 and/or the macro cell 110. In example embodiments, a UE can be communicatively coupled via a network node/device to a wireless communication network, e.g., a communication service provider network(s) via a suitable communications link. Note that (such as via sidelink for example), a UE with sufficient capability can act as a relay node for another cell, including for backhaul traffic, or can have backhaul traffic sent via a relay node, and thus the term "cell" or the like as used herein is any network device, and is not necessarily set in a fixed location.

A UE can be a mobile device such as a cellular phone, a smartphone, a tablet computer, a wearable device, a virtual reality (VR) device, a heads-up display (HUD) device, a smart car, a machine-type communication (MTC) device, and the like. A UE can also refer to any type of wireless device that communicates with a radio network node in a cellular or mobile communication system. Examples of user equipments are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. A user equipment such as the UE 102(1) can also comprise IoT devices that communicate wirelessly. In various embodiments, system 100 is or comprises a wireless communication network serviced by one or more wireless communication network providers.

The non-limiting term network node (or radio network node) is used herein to refer to any type of network node/network device cells 101-105 and 110 that serve the one or more user equipments (UEs) and/or are connected to another network node(s), network element, or another network node from which the one or more user equipments can receive a radio signal. Network nodes can have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes can comprise but are not limited to: NodeB devices, base station (BS) devices, access point (AP) devices, and radio access network (RAN) devices. The network node can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the network node can be referred to as a gNodeB device.

The wireless communication system 100 can employ various cellular technologies and modulation schemes to facilitate wireless radio communications between user equipment devices and the network devices. For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the nodes/devices and the network device) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In general, the technology described herein allows a cell to report its self-backhaul capability to another cell. By way of example, consider that in FIGS. 1 and 2, the cell 103 needs to send backhaul traffic to the macro cell 110, and needs to select a cell as a relay node for this purpose. In the example of FIG. 1, consider that the cell 103 communicates with the cell 105 to obtain its system information to determine whether the cell 105 can operate as such a relay node for communicating self-backhaul (e.g., IAB) data traffic. Note that the example assumes that the cell is not barred, e.g., based on a Master Information Block (MIB) "cell barred" parameter value previously obtained with respect to the cell 105.

However, in the example of FIG. 1, the cell 105 reports that it is not IAB capable, as depicted by the "SIB (no)" communication. For example, such a cell 105 may be deployed only for additional capacity for devices under its coverage. In one or more implementations, this parameter is communicated via parameter data in a system information block (SIB), e.g., in a System Information Block Type 1 (SIB1) message.

Thus, the cell needs to select another cell with self-backhaul capability as a relay node. In the example of FIG. 2, again assuming that the cell 104 is not barred based on the MIB data, the cell 103 obtains the SIB message from the cell 104. This time, the SIB message indicates that the cell 104 is self-backhaul capable, as depicted by the "SIB (yes)" message. Based on this selection criterion (as well as other criteria being met, including PLMN ID matching and the RxLevMin threshold being met as described below with reference to FIG. 5), the cell 103 registers with (camps on) the cell 104 for communicating the backhaul traffic. This is indicated by the dashed lines in FIG. 2, from the cell 103 to the cell 104 to the macro cell 110.

FIGS. 3 and 4 show one implementation of communicating the self-backhaul capability (yes or no) data. In particular, FIG. 3 describes part of a SIB1 message content (block 330) (as described in 5G NR SIB1, 3GPP TS 38.331 version 15.4.0). As seen in FIG. 3, this message format includes a "CellAccessRelatedInfo" information element, highlighted via the dashed block 332.

As described herein, FIG. 4 shows a variation of the format of a "CellAccessRelatedInfo" information element (block 440). As can be seen by the dashed block 442, the CellAccessRelatedInfo information element is enhanced to include an IAB capable parameter (e.g., an attribute), which carries the self-backhaul capable (or not) data.

As can be readily understood, this is only one example implementation of where such information can be located among the various communications that can occur between cells. For example, the MIB data or another SIB type message could carry such data.

It is also feasible for a cell to report the data indicating self-backhaul capable, and not report anything for this parameter if not capable. Further, note that "self-backhaul capable" is not limited to whether a cell has the ability to carry such relayed data, but can vary due to other factors.

For example, there can be a cell that otherwise would be self-backhaul capable, but right now is too busy with other communications (possibly due to already relaying data for other cells) to serve as a relay node for more data; such a cell may indicate not capable (yet later indicate capable when not as busy).

Figure 5:
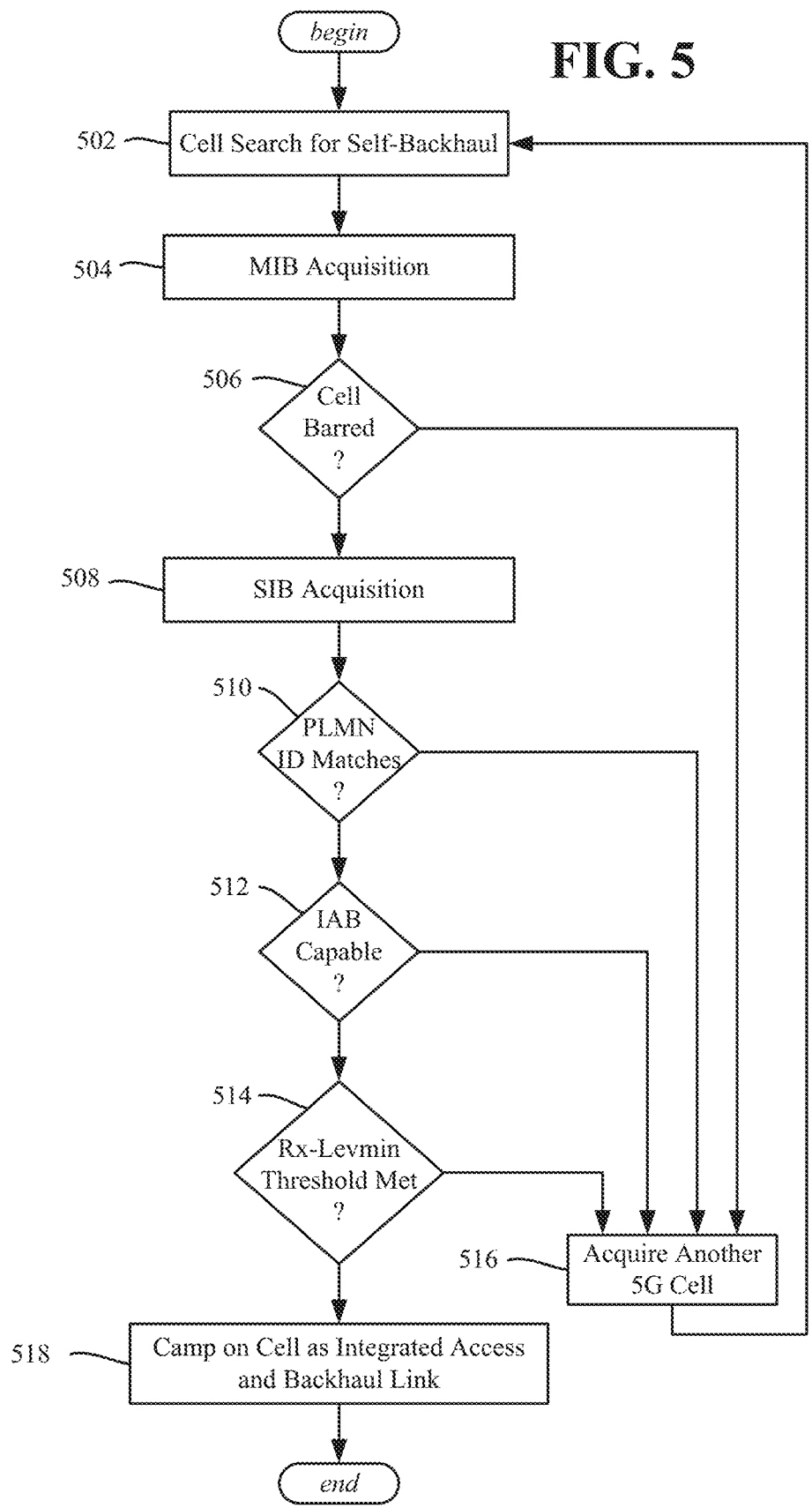
FIG. 5 is a flow diagram showing example operations of a network device to select a cell as a self-backhaul link, such as for relaying integrated access and backhaul traffic, in accordance with various aspects and embodiments of the subject disclosure.

FIG. 5 shows example operations of a cell selection procedure for IAB traffic that is enhanced with IAB capability information, beginning at operation 502 where a cell searches to select another cell as an IAB link. Note that the example of FIG. 5 assumes that at least one cell is available for selection as an IAB link; errors and other situations that can occur are omitted for brevity.

Operation 504 represents the MIB acquisition from the other cell, which in general is a known procedure, part of which comprises obtaining and decoding the MIB if not previously performed and stored. Operation 506 evaluates whether the cell is barred (the MIB can indicate "CellBarred=barred"); if so, operation 516 is performed to acquire/attempt to select another 5G cell as a backhaul link.

If not barred, operation 508 represents the SIB acquisition from the other cell, which in general is known and includes using the parameters in the MIB to attempt to decode the SIB1 message, (if the SIB1 message was not previously obtained, decoded and stored). The further operations in this example assume that following operation 508, the SIB1 message is successfully decoded and stored.

Operation 510 represents evaluating whether the public land mobile network identifier (PLMN ID) of the other wireless network cell matches identity information associated with the network device (the cell that is searching for an IAB link in this example). If not, another cell needs to be selected via operation 516. If so, the IAB capability of the cell is evaluated at operation 512.

As set forth above, in one or more implementations such as shown in the examples of FIGS. 3 and 4, the IAB capability of the cell is determined via the "CellAccessRelatedInfo" information element of the SIB1 message. If not IAB capable, another cell needs to be selected via operation 516.

If IAB capable, operation 512 branches to operation 514 where the signal quality of the cell is evaluated, which in one or more implementations evaluates whether the RxLevMin threshold (provided in the system information block) is met. If not, another cell needs to be selected via operation 516. If so, the needed selection criteria is met, and the cell is selected; that is, at operation 518 the selecting cell camps on the selected cell as an Integrated Access and Backhaul link, which includes registering its presence in the tracking area of the selected cell.

Figure 6:
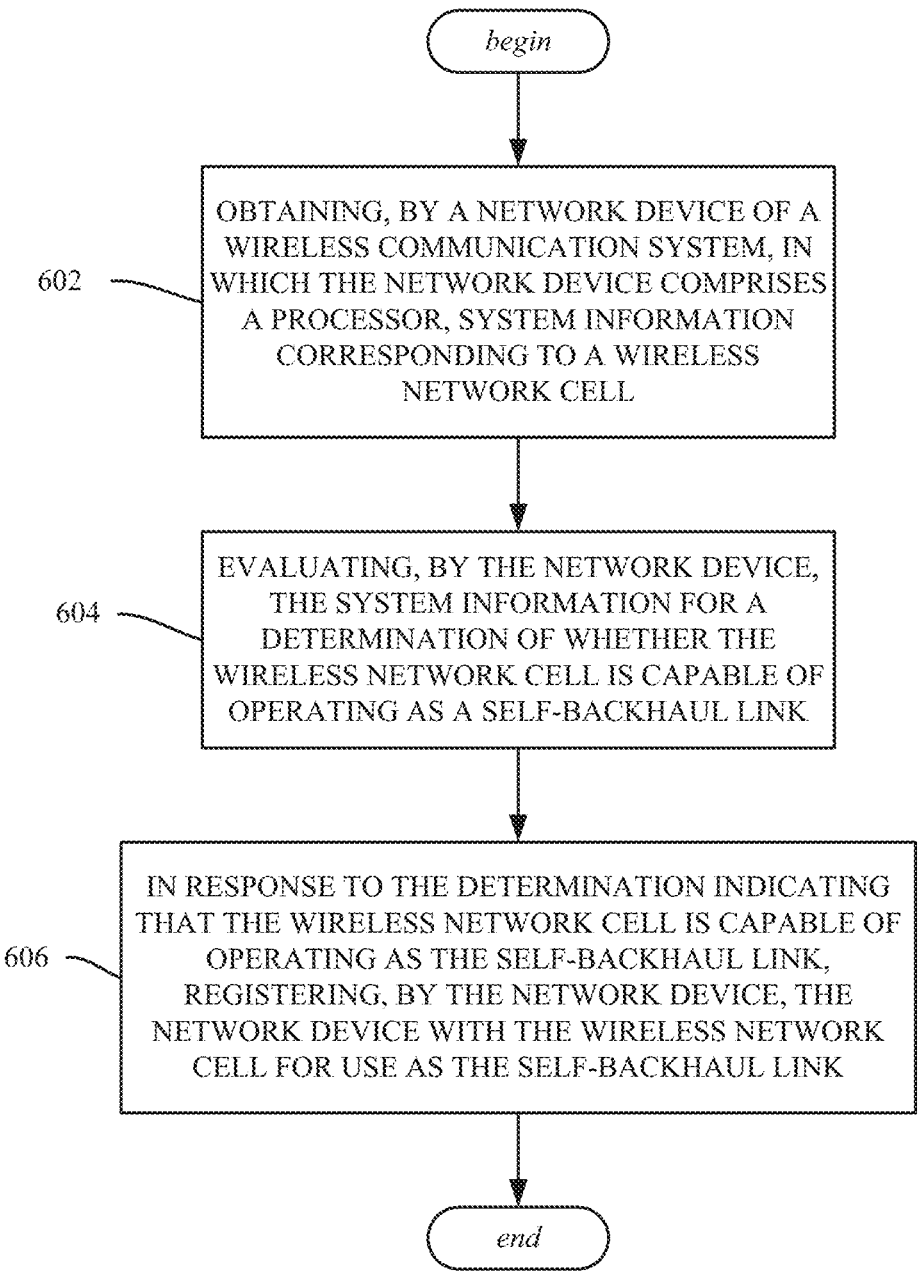
FIG. 6 is a flow diagram showing example operations of a network device for selecting a cell as a self-backhaul link, in accordance with various aspects and embodiments of the subject disclosure.

One or more aspects, such as those implemented in example operations of a method, are shown in FIG. 6 in accordance with various aspects and embodiments of the subject disclosure. Operation 602 represents obtaining, by a network device of a wireless communication system, in which the network device comprises a processor, system information corresponding to a wireless network cell. Operation 604 represents evaluating, by the network device, the system information for a determination of whether the wireless network cell is capable of operating as a self-backhaul link. Operation 606 represents, in response to the determination indicating that the wireless network cell is capable of operating as the self-backhaul link, registering, by the network device, the network device with the wireless network cell for use as the self-backhaul link.

Aspects can comprise communicating, by the network device, with the wireless network cell to obtain a master information block associated with the wireless network cell, and evaluating, by the network device, master information block parameter data in the master information block to determine that that the wireless network cell is not barred from use by the network device. The system information corresponding to the wireless network cell can comprise a system information block; evaluating can comprise evaluating a self-backhaul capable parameter value associated with the system information block.

The determination indicating that the wireless network cell is capable of operating as the self-backhaul link can comprise indicating that a self-backhaul capable parameter data value in the system information indicates that the wireless network cell is self-backhaul capable, that a public land mobile network identifier of the wireless network cell matches identity information associated with the network device, and that the wireless network cell satisfies at least a minimum signal level.

Figure 7:
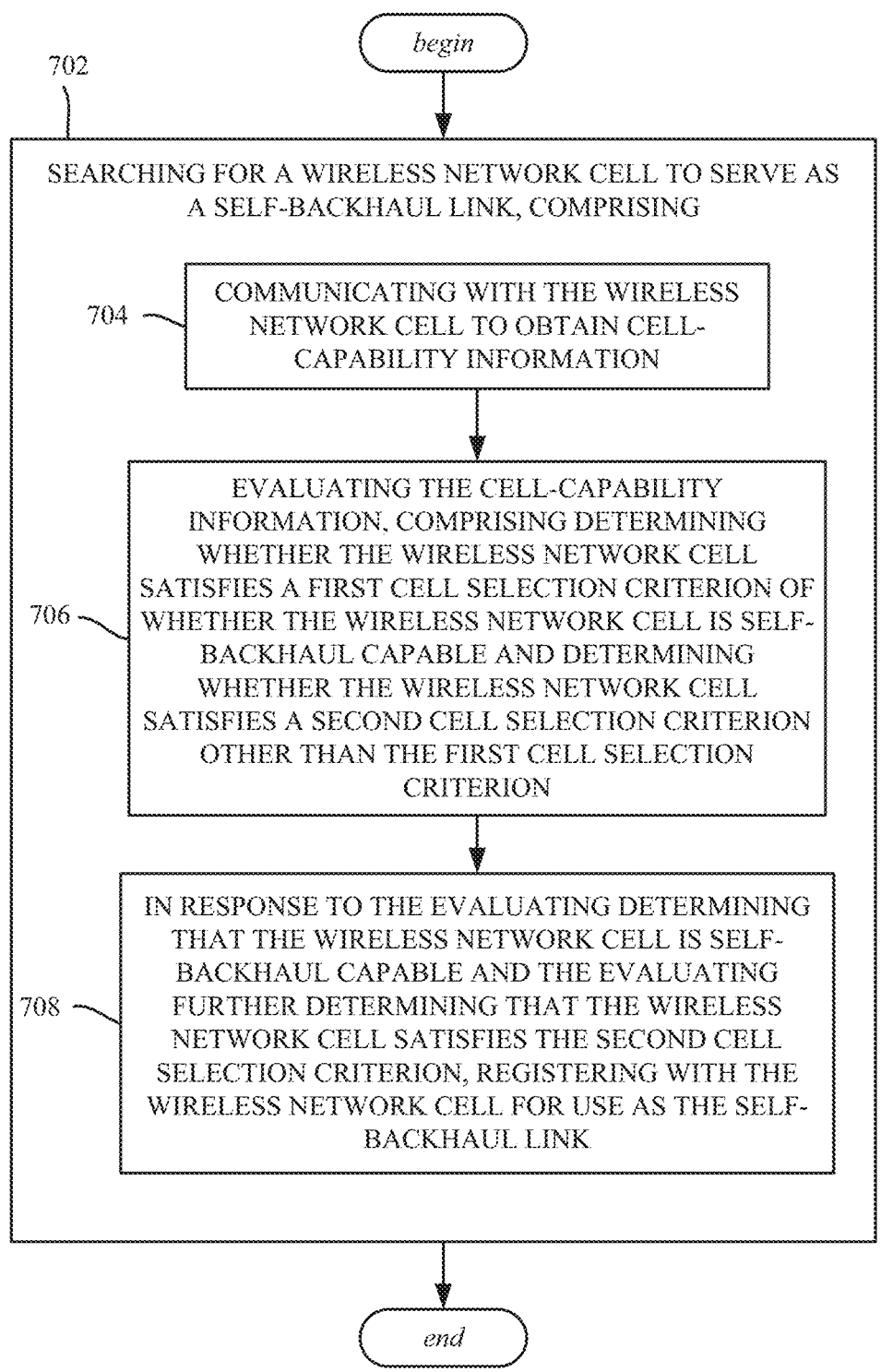
FIG. 7 is a flow diagram showing example operations of a network device for selecting a cell as a self-backhaul link based on meeting selection criteria, in accordance with various aspects and embodiments of the subject disclosure.

One or more example aspects are represented in FIG. 7, and can correspond to a network device comprising a processor and a memory that stores executable instructions that, when executed by the processor, facilitate performance of operations and/or components. Example operations comprise operation 702, which represents searching for a wireless network cell to serve as a self-backhaul link, comprising operations 704, 706 and 708. Operation 704 represents communicating with the wireless network cell to obtain cell-capability information. Operation 704 represents evaluating the cell-capability information, comprising determining whether the wireless network cell satisfies a first cell selection criterion of whether the wireless network cell is self-backhaul capable and determining whether the wireless network cell satisfies a second cell selection criterion other than the first cell selection criterion. Operation 706 represents, in response to the evaluating determining that the wireless network cell is self-backhaul capable and the evaluating further determining that the wireless network cell satisfies the second cell selection criterion, registering with the wireless network cell for use as the self-backhaul link.

The wireless network cell can be a first wireless network cell, the cell-capability information can be first cell-capability information, and further operations can comprise, in response to the determining that the first wireless network cell is not self-backhaul capable, communicating with a second wireless network cell to obtain second cell-capability information, evaluating the second cell-capability information, comprising determining whether the second wireless network cell is self-backhaul capable and determining whether the second wireless network cell satisfies a third cell selection criterion other than the first and second cell selection criteria, and in response to the evaluating the second cell-capability information determining that the second wireless network cell is self-backhaul capable and the evaluating the second cell-capability information further determining that the second wireless network cell satisfies the third cell selection criterion, registering to the second wireless network cell for use as the self-backhaul link.

Further operations can comprise communicating with the wireless network cell to obtain a master information block associated with the wireless network cell, and evaluating master information block parameter data in the master information block to determine that that the wireless network cell is not prevented from being used by the network device.

Determining whether the wireless network cell is self-backhaul capable can comprise obtaining a system information block associated with the wireless network cell and evaluating parameter data in the system information block.

The system information block can comprise a system information block type 1 (SIB1) data block, and wherein the parameter data in the system information block comprises an integrated access and backhaul capable parameter value. The self-backhaul capable parameter value can be in the cell access related information (CellAccessRelatedInfo) information element of the system information block type 1 data block The wireless network can comprise a millimeter wave cell. The network device can comprise a millimeter wave cell. The network device can comprise a first millimeter wave cell, and the wireless network cell can comprise a second millimeter wave cell.

Determining that the wireless network cell satisfies the second cell selection criterion can comprise determining that a public land mobile network identifier of the wireless network cell matches identity information associated with the network device. Determining that the wireless network cell satisfies the second cell selection criterion can comprise determining that that the wireless network cell satisfies at least a specified minimum signal level. Determining that the wireless network cell satisfies the second cell selection criterion can comprise determining that that the wireless network cell satisfies the RxLevMin threshold.

Figure 8:
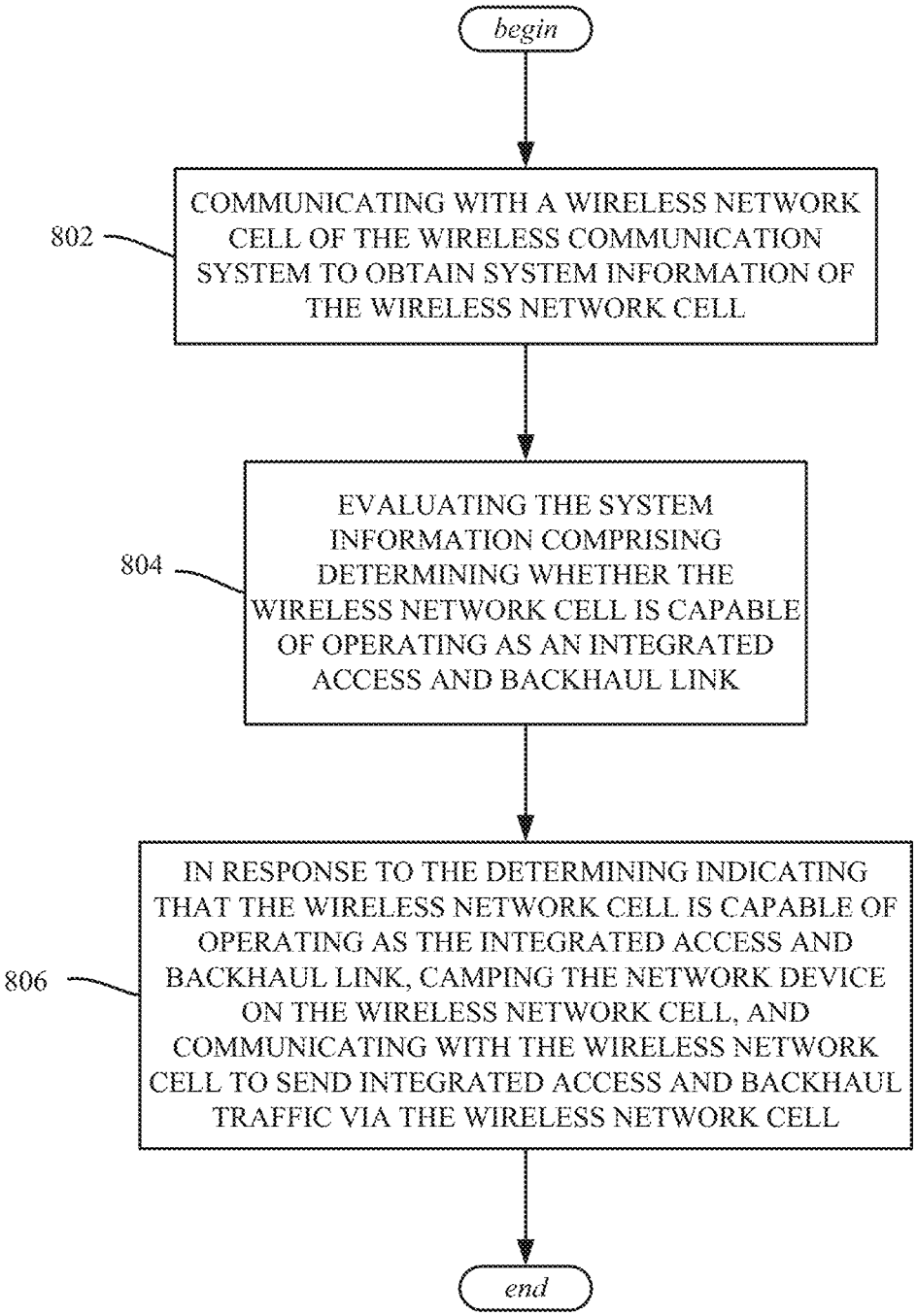
FIG. 8 is a flow diagram showing example operations of a network device for selecting a cell as a self-backhaul link and using the selected cell to send integrated access and backhaul traffic, in accordance with various aspects and embodiments of the subject disclosure.

One or more aspects, such as implemented in a machine-readable storage medium, comprising executable instructions that, when executed by a processor, facilitate performance of operations, are represented in FIG. 8. Example operations comprise operation 802, which represents communicating with a wireless network cell of the wireless communication system to obtain system information of the wireless network cell. Operation 804 represents evaluating the system information comprising determining whether the wireless network cell is capable of operating as an integrated access and backhaul link. Operation 806 represents, in response to the determining indicating that the wireless network cell is capable of operating as the integrated access and backhaul link, camping the network device on the wireless network cell, and communicating with the wireless network cell to send integrated access and backhaul traffic via the wireless network cell.

Further operations can comprise determining that the wireless network cell is not barred from usage by the network device.

Communicating with the wireless network cell to obtain the system information can comprise receiving a system information block from the wireless network cell, and the determining whether the wireless network cell is capable of operating as the integrated access and backhaul link can comprise evaluating an integrated access and backhaul capability parameter value in the system information block.

Determining whether the wireless network cell is capable of operating as the integrated access and backhaul link can comprise determining that an integrated access and backhaul parameter value in the system information indicates that the wireless network cell is integrated access and backhaul capable, determining that a public land mobile network identifier of the wireless network cell matches identity information associated with the network device, and determining that the wireless network cell satisfies at least a desired minimum signal level.

As can be seen, the technology described herein provides for improved self-backhaul cell selection efficiency. This facilitates a 5G network supporting various applications, including eMBB, mission critical, and URLLC applications.

Figure 9:
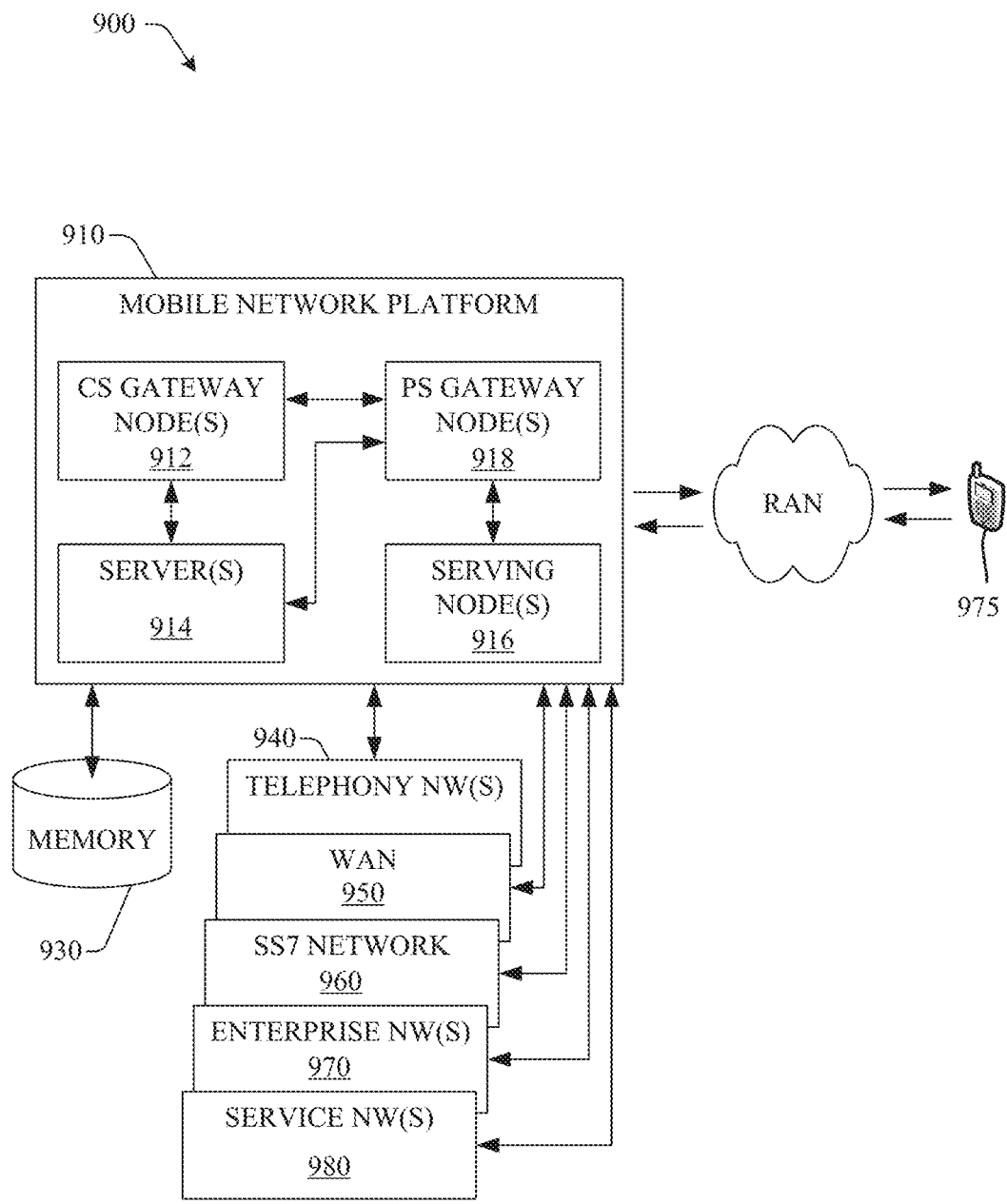
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
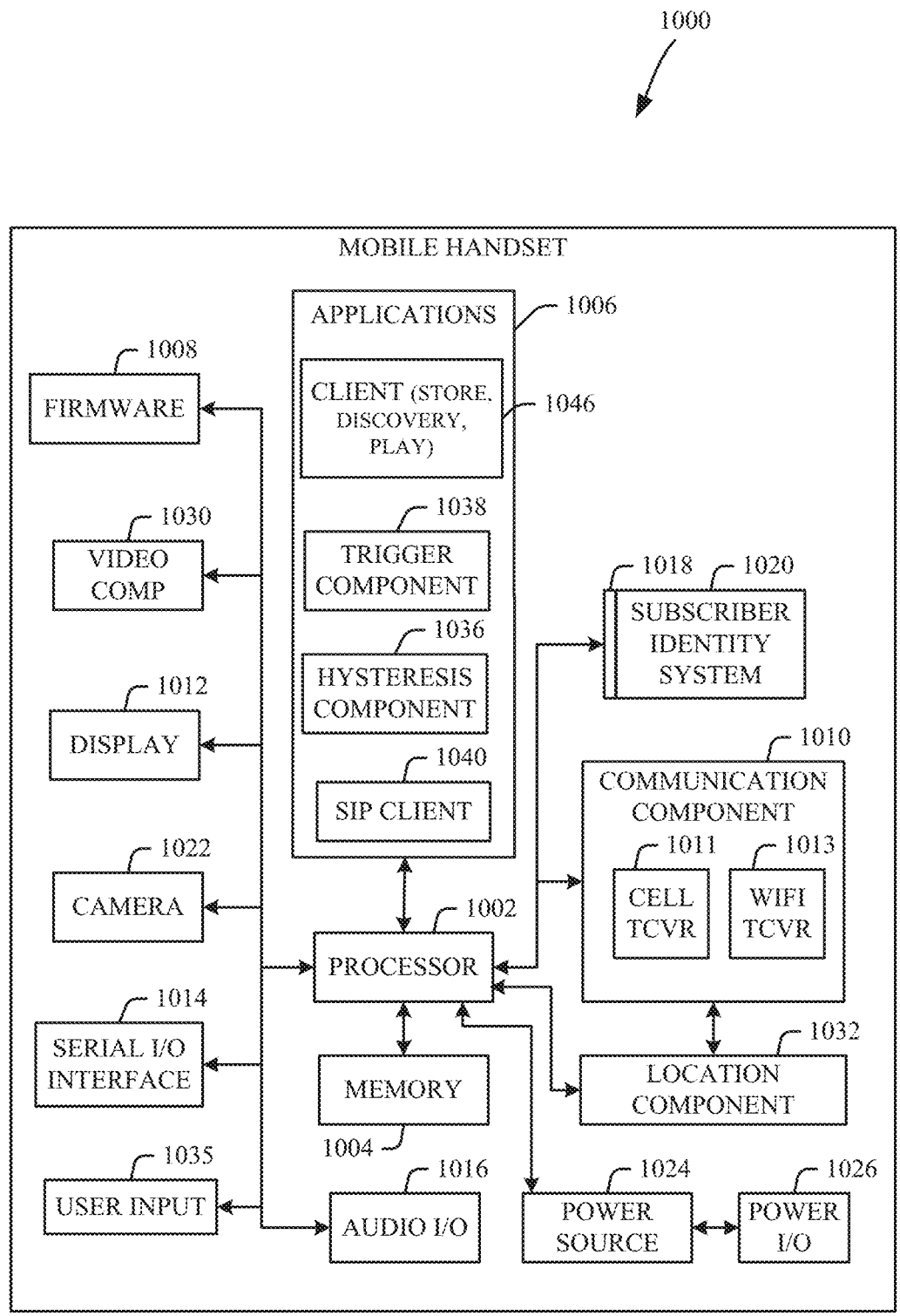
FIG. 10 illustrates an example block diagram of an example user equipment that can be a mobile handset in accordance with various aspects and embodiments of the subject disclosure.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
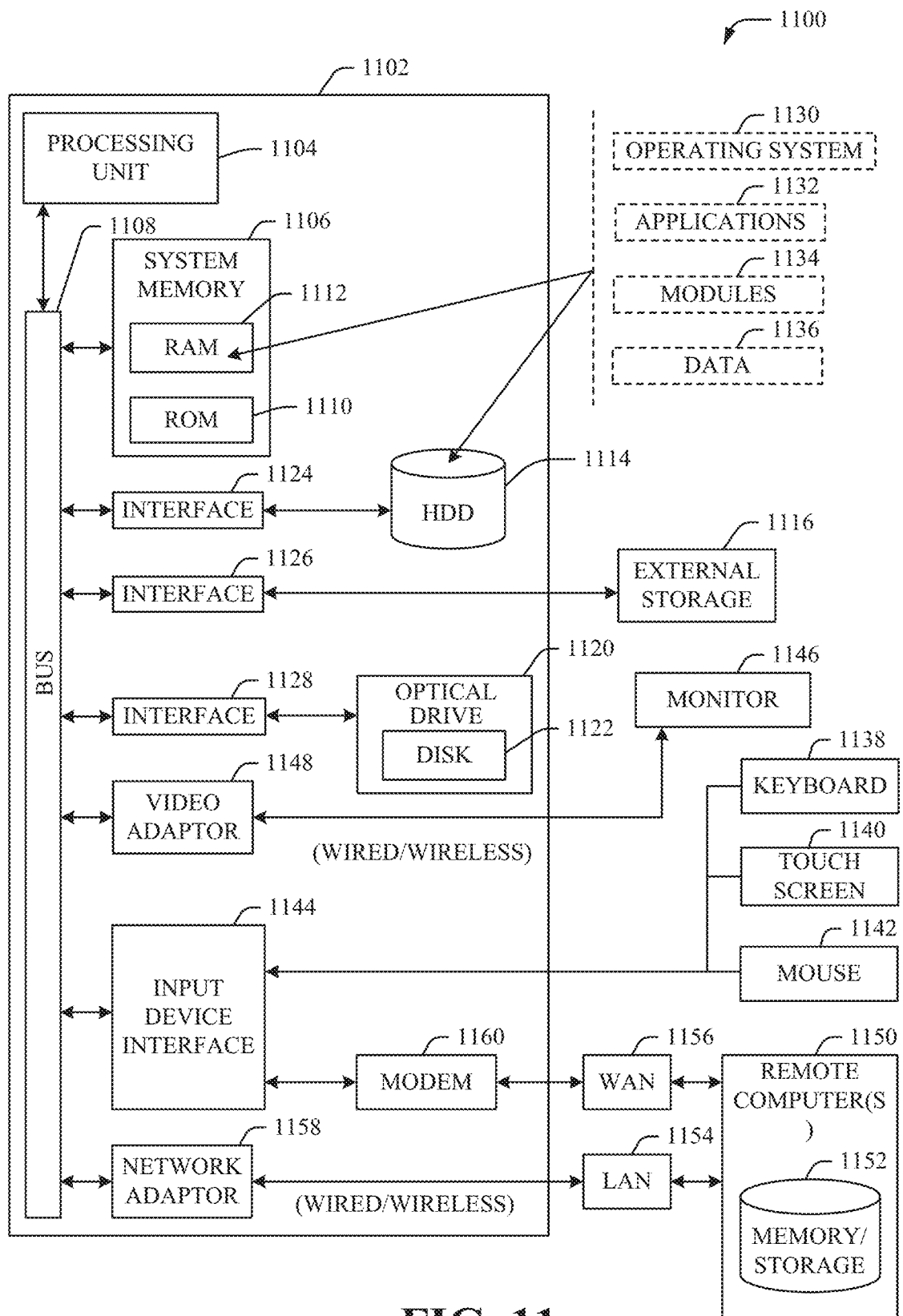
FIG. 11 illustrates an example block diagram of a computer that can be operable to execute processes and methods in accordance with various aspects and embodiments of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices. Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 9 GHz radio bands, at an 11 Mbps (802.11b) or 94 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary.

Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    obtaining, by a first millimeter wave network cell comprising a processor, system information corresponding to a wireless network second millimeter wave network cell;
    evaluating, by the first millimeter wave network cell, the system information for a determination of whether the second millimeter wave network cell is capable of operating as a relay node to a self-backhaul link for the first millimeter wave network cell; and
    in response to the determination indicating that the second millimeter wave network cell is capable of operating as the relay node to the self-backhaul link for the first millimeter wave network cell, registering, by the first millimeter wave network cell, the first millimeter wave network cell with the second millimeter wave network cell for use as the relay node to the self-backhaul link for the first millimeter wave network cell.

2. The method of claim 1, further comprising, communicating, by the first millimeter wave network cell, with the second millimeter wave network cell to obtain a master information block associated with the second millimeter wave network cell, and evaluating, by the first millimeter wave network cell, master information block parameter data in the master information block to determine that that the second millimeter wave network cell is not barred from use by the first millimeter wave network cell.

3. The method of claim 1, wherein the system information corresponding to the second millimeter wave network cell comprises a system information block, and wherein the evaluating comprises evaluating a self-backhaul capable parameter value associated with the system information block.

4. The method of claim 1, wherein the determination indicating that the second millimeter wave network cell is capable of operating as the relay node to the self-backhaul link for the first millimeter wave network cell comprises the determination indicating:
    that a self-backhaul capable parameter data value in the system information indicates that the second millimeter wave network cell is self-backhaul capable,
    that a public land mobile network identifier of the second millimeter wave network cell matches identity information associated with the first millimeter wave network cell, and
    that the second millimeter wave network cell satisfies at least a minimum signal level.

5. A first millimeter wave cell in a wireless communication system, comprising:
    a processor; and
    a memory that stores executable instructions that, when executed by the processor, facilitate performance of operations, the operations comprising:
        searching for a second millimeter wave cell to serve as a relay node to a self-backhaul link for the first millimeter wave cell, comprising,
            communicating with the second millimeter wave cell to obtain cell-capability information;
            evaluating the cell-capability information, comprising determining whether the second millimeter wave cell satisfies a first cell selection criterion of whether the second millimeter wave cell is self-backhaul capable and determining whether the second millimeter wave cell satisfies a second cell selection criterion other than the first cell selection criterion; and
            in response to the evaluating determining that the second millimeter wave cell is self-backhaul capable and the evaluating further determining that the second millimeter wave cell satisfies the second cell selection criterion, registering with the second millimeter wave cell to serve as the relay node to the self-backhaul link for the first millimeter wave cell.

6. The first millimeter wave cell of claim 5, wherein the cell-capability information is first cell-capability information, and wherein the operations further comprise,
    in response to the determining that the second millimeter wave cell is not self-backhaul capable, communicating with a third millimeter wave cell to obtain second cell-capability information,
    evaluating the second cell-capability information, comprising determining whether the third millimeter wave cell is self-backhaul capable and determining whether the third millimeter wave cell satisfies a third cell selection criterion other than the first and second cell selection criteria, and in response to the evaluating the second cell-capability information determining that the third millimeter wave cell is self-backhaul capable and the evaluating the second cell-capability information further determining that the third millimeter wave cell satisfies the third cell selection criterion, registering to the third millimeter wave cell to serve as the relay node to the self-backhaul link for the first millimeter wave cell.

7. The first millimeter wave cell of claim 5, wherein the operations further comprise communicating with the second millimeter wave cell to obtain a master information block associated with the second millimeter wave cell, and evaluating master information block parameter data in the master information block to determine that that the second millimeter wave cell is not prevented from being used by the first millimeter wave cell.

8. The first millimeter wave cell of claim 5, wherein the determining whether the second millimeter wave cell is self-backhaul capable comprises obtaining a system information block associated with the second millimeter wave cell and evaluating parameter data in the system information block.

9. The first millimeter wave cell of claim 8, wherein the system information block comprises a system information block type 1 (SIB1) data block, and wherein the parameter data in the system information block comprises an integrated access and backhaul capable parameter value.

10. The first millimeter wave cell of claim 9, wherein the integrated access and backhaul capable parameter value is in a cell access related information (CellAccessRelatedInfo) information element of the system information block type 1 data block.

11. The first millimeter wave cell of claim 5, wherein the determining that the second millimeter wave cell satisfies the second cell selection criterion comprises determining that a public land mobile network identifier of the second millimeter wave cell matches identity information associated with the first millimeter wave cell.

12. The first millimeter wave cell of claim 5, wherein the determining that the second millimeter wave cell satisfies the second cell selection criterion comprises determining that that the second millimeter wave cell satisfies at least a specified minimum signal level.

13. The first millimeter wave cell of claim 5, wherein the determining that the second millimeter wave cell satisfies the second cell selection criterion comprises determining that the second millimeter wave cell satisfies a RxLevMin threshold.

14. A non-transitory machine-readable medium, comprising executable instructions that, when executed by a processor of a first millimeter wave network cell, facilitate performance of operations, the operations comprising:
    communicating with a second millimeter wave network cell of a wireless communication system to obtain system information of the second millimeter wave network cell;
    evaluating the system information comprising determining whether the second millimeter wave network cell is capable of operating as a relay node to an integrated access and backhaul link for the first millimeter wave network cell; and
    in response to the determining indicating that the second millimeter wave network cell is capable of operating as the relay node to the integrated access and backhaul link for the first millimeter wave network cell, camping the first millimeter wave network cell on the second millimeter wave network cell, and communicating with the second millimeter wave network cell to send integrated access and backhaul traffic via the second millimeter wave network cell.

15. The non-transitory machine-readable medium of claim 14, wherein the operations further comprise determining that the second millimeter wave network cell is not barred from usage by the first millimeter wave network cell.

16. The non-transitory machine-readable medium of claim 14, wherein the communicating with the second millimeter wave network cell to obtain the system information comprises receiving a system information block from the second millimeter wave network cell, and wherein the determining whether the second millimeter wave network cell is capable of operating as the relay node to the integrated access and backhaul link for the first millimeter wave network cell comprises evaluating an integrated access and backhaul capability parameter value in the system information block.

17. The non-transitory machine-readable medium of claim 14, wherein the determining whether the second millimeter wave network cell is capable of operating as the relay node to the integrated access and backhaul link for the first millimeter wave network cell comprises determining that an integrated access and backhaul parameter value in the system information indicates that the second millimeter wave network cell is integrated access and backhaul capable, determining that a public land mobile network identifier of the second millimeter wave network cell matches identity information associated with the first millimeter wave network cell, and determining that the second millimeter wave network cell satisfies at least a desired minimum signal level.

18. The non-transitory machine-readable medium of claim 17, wherein the determining that the second millimeter wave network cell satisfies at least the desired minimum signal level comprises determining that the second millimeter wave network cell satisfies a RxLevMin threshold.

19. The non-transitory machine-readable medium of claim 16, wherein the system information block comprises a system information block type 1 (SIB1) data block.

20. The non-transitory machine-readable medium of claim 19, wherein the integrated access and backhaul capability parameter value is in a cell access related information (CellAccessRelatedInfo) information element of the system information block type 1 data block.

* * * * *